United States Patent
Fu et al.

(10) Patent No.: US 8,142,838 B2
(45) Date of Patent: *Mar. 27, 2012

(54) METHOD FOR MAKING LIQUID CRYSTAL DISPLAY SCREEN

(75) Inventors: Wei-Qi Fu, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 558 days.

This patent is subject to a terminal disclaimer.

(21) Appl. No.: 12/313,450

(22) Filed: Nov. 20, 2008

(65) Prior Publication Data

US 2009/0104832 A1    Apr. 23, 2009

(30) Foreign Application Priority Data

Feb. 22, 2008  (CN) .......................... 2008 1 0065411

(51) Int. Cl.
*H01L 21/00* (2006.01)
*B05D 5/06* (2006.01)

(52) U.S. Cl. ................ 427/64; 427/68; 427/71; 427/77; 257/E21.049; 257/E51.04; 438/30; 977/742; 977/842; 977/952

(58) Field of Classification Search .................. None
See application file for complete search history.

(56) References Cited

U.S. PATENT DOCUMENTS

| 6,731,356 | B2 * | 5/2004  | Yamada et al. ................. 349/84  |
| 6,985,204 | B2 * | 1/2006  | Lim et al. ...................... 349/155 |
| 7,045,108 | B2   | 5/2006  | Jiang et al.                           |
| 7,196,463 | B2 * | 3/2007  | Okai et al. ..................... 313/495 |
| 7,630,040 | B2 * | 12/2009 | Liu et al. ....................... 349/123 |
| 7,746,418 | B2 * | 6/2010  | Wakita ............................. 349/43 |
| 7,777,928 | B2 * | 8/2010  | Moore .......................... 359/245 |
| 7,794,639 | B2   | 9/2010  | Huang et al.                           |
| 7,989,241 | B2 * | 8/2011  | Fu et al. ......................... 438/30 |
| 2004/0047038 | A1 | 3/2004 | Jiang et al.                           |
| 2004/0053780 | A1 | 3/2004 | Jiang et al.                           |
| 2005/0007648 | A1 | 1/2005 | Wu et al.                              |
| 2005/0184642 | A1*| 8/2005 | Oh et al. ....................... 313/495 |

(Continued)

FOREIGN PATENT DOCUMENTS

CN          1483667 A        3/2004

(Continued)

OTHER PUBLICATIONS

Fan et al., Explorations on growth mechanism, controlled synthesis and applications of carbon nanotubes, Physics, vol. 35, No. 5, pp. 376-381,(2006).

*Primary Examiner* — Jeffrey Wollschlager

(74) *Attorney, Agent, or Firm* — Altis Law Group, Inc.

(57) ABSTRACT

A method for making a liquid crystal display screen includes the steps of: providing a base comprising a surface; manufacturing a substrate, wherein manufacturing a substrate comprises: placing a carbon nanotube layer on the surface of the base, the carbon nanotube layer comprising a plurality of carbon nanotubes substantially aligned along a same direction; applying a fixing layer on a surface of the carbon nanotube layer, thereby obtaining a first substrate; and supplying a liquid crystal layer, wherein the carbon nanotubes of a first substrate are arranged perpendicular to that of a second substrate.

15 Claims, 3 Drawing Sheets

U.S. PATENT DOCUMENTS

| | | | |
|---|---|---|---|
| 2006/0113510 A1* | 6/2006 | Luo et al. | 252/500 |
| 2006/0188723 A1* | 8/2006 | Rowley et al. | 428/408 |
| 2006/0238693 A1* | 10/2006 | Yoon | 349/155 |
| 2006/0274048 A1* | 12/2006 | Spath et al. | 345/173 |
| 2007/0115413 A1 | 5/2007 | Liu et al. | |
| 2007/0116916 A1 | 5/2007 | Ito et al. | |
| 2007/0296897 A1 | 12/2007 | Liu et al. | |
| 2009/0073363 A1 | 3/2009 | Fu et al. | |
| 2009/0269684 A1* | 10/2009 | Fu et al. | 430/20 |
| 2009/0272935 A1 | 11/2009 | Hata et al. | |
| 2010/0098902 A1* | 4/2010 | Kotov et al. | 428/105 |

FOREIGN PATENT DOCUMENTS

| | | |
|---|---|---|
| CN | 1781034 | 5/2006 |
| CN | 1955819 A | 5/2007 |
| CN | 1979948 | 6/2007 |
| JP | 2002-250909 | 9/2002 |
| JP | 2004-102217 | 4/2004 |
| JP | 2004-107196 | 4/2004 |
| JP | 2004-348121 | 12/2004 |
| JP | 2006-201575 | 8/2006 |
| JP | 2007-122057 | 5/2007 |
| JP | 2007-182352 | 7/2007 |
| JP | 2007-314776 | 12/2007 |
| JP | 2008-3606 | 1/2008 |
| TW | I228605 | 3/2005 |
| TW | I255487 | 5/2006 |
| TW | 200621631 | 7/2006 |
| TW | 200938917 | 9/2009 |

* cited by examiner

METHOD FOR MAKING LIQUID CRYSTAL DISPLAY SCREEN

RELATED APPLICATIONS

This application is related to commonly-assigned applications entitled "LIQUID CRYSTAL DISPLAY SCREEN", filed Nov. 20, 2008, (application Ser. No. 12/313,452); "LIQUID CRYSTAL DISPLAY SCREEN", filed on Nov. 20, 2008 (application Ser. No. 12/313,394); "LIQUID CRYSTAL DISPLAY SCREEN", filed on Nov. 20, 2008, (application Ser. No. 12/313,393); "LIQUID CRYSTAL DISPLAY SCREEN", filed on Nov. 20, 2008, (application Ser. No. 12/313,415); "LIQUID CRYSTAL DISPLAY SCREEN", filed on Nov. 20, 2008, (application Ser. No. 12/313,440); and "METHOD FOR MAKING LIQUID CRYSTAL DISPLAY SCREEN", filed on Nov. 20, 2008, (application Ser. No. 12/313,414). The disclosures of the above-identified applications are incorporated herein by reference.

BACKGROUND

1. Field of the Invention

The present invention relates to methods for making liquid crystal display screens and, particularly, to a method for making a carbon-nanotube-based liquid crystal display screen.

2. Discussion of Related Art

Referring to FIG. 1, a conventional liquid crystal display screen 100 for liquid crystal display (LCD), according to the prior art, generally includes a first substrate 104, a second substrate 112, and a liquid crystal layer 118. The first substrate 104 is disposed opposite to the second substrate 112. The liquid crystal layer 118 is located between the first substrate 104 and the second substrate 112. A first transparent electrode layer 106 and a first alignment layer 108 are formed in that order on an inner surface of the first substrate 104, which faces toward the liquid crystal layer 118. A first polarizer 102 is formed on an outer surface of the first substrate 104, which faces away from the liquid crystal layer 118. A second transparent electrode layer 114 and a second alignment layer 116 are formed in order on a surface of the second substrate 112, which is near the liquid crystal layer 118. A second polarizer 110 is formed on an outer surface of the second substrate 112, which faces away from the liquid crystal layer 118.

The quality and performance of the alignment layers 108, 116 are key factors that determine the display quality of the liquid crystal display screen 100. A high quality liquid crystal display screens demand steady and uniform arrangement of liquid crystal molecules 1182 of the liquid crystal layer 118. This is achieved in part by correct arrangement of the liquid crystal molecules 1182 at the alignment layers 108, 116. Materials to make the alignment layers 108, 116 are typically selected from the group consisting of polystyrene, ramification of polystyrene, polyimide, polyvinyl alcohol, epoxy resin, polyamine resin, and polysiloxane. The selected materials is used to create a preform of each alignment layer 108, 116. The preform is then treated by one method selected from the group consisting of rubbing, incline evaporating oxide silicon, and atomic beam alignment micro-treatment. Therefore, grooves are formed on the treated surfaces of the preform, and the alignment layer 108, 116 obtained. The grooves affect the arrangement and orientations of the liquid crystal molecules 118.

In the liquid crystal display screen 100, the liquid crystal molecules 1182 are cigar-shaped. A plurality of parallel first grooves 1082 is formed at an inner surface of the first alignment layer 108. A plurality of parallel second grooves 1162 are formed on an inner surface of the second alignment layer 116. The first grooves 1082 are perpendicular to the second grooves 1162. The grooves 1082, 1162 function so as to align the orientation of the liquid crystal molecules 1182. In particular, the liquid crystal molecules 1182 adjacent to the alignment layers 108, 116 are aligned parallel to the grooves 1082, 1162 respectively. When the grooves 1082 and 1162 are at right angles and the substrates 104 and 112 are spaced appropriately, the liquid crystal molecules 1182 can automatically twist progressively over 90 degrees from the top of the liquid crystal layer to the bottom of the liquid crystal layer 118.

The alignment layers 108 and 116 can be made using a rubbing method. The rubbing method can be exemplified using the manufacturing method for the alignment layer 116. The manufacturing method for the alignment layers 116 generally includes the steps of: coating a layer of alignment material, such as polyimide, on the inner surface of the second transparent electrode layer 114; and rubbing the surface of the alignment material using rubbing cloth to form the plurality of fine grooves 1162.

However, some drawbacks arise from a mechanical contact of the rubbing cloth with the surface of the alignment material. This method is complicated because a baking process of the polyimide layer is very time-consuming, and the rubbing introduces large electrostatic charges as well as plenty of dust contamination, which in turn requires other facilities and cleansing processes to eliminate. In addition, the rubbing cloth has a limited lifespan and needs to be replaced frequently.

What is needed, therefore, is to provide a method for making a liquid crystal display screen with simple fabrication process.

SUMMARY

A method for making a liquid crystal display screen includes the steps of: providing a base comprising a surface; manufacturing a substrate, wherein manufacturing a substrate comprises: placing a carbon nanotube layer on the surface of the base, the carbon nanotube layer comprising a plurality of carbon nanotubes substantially aligned along a same direction; applying a fixing layer on a surface of the carbon nanotube layer, thereby obtaining a first substrate; and supplying a liquid crystal layer, wherein the carbon nanotubes of a first substrate are arranged perpendicular to that of a second substrate.

Other novel features and advantages of the present method for making a liquid crystal display screen will become more apparent from the following detailed description of the present embodiments when taken in conjunction with the accompanying drawings.

BRIEF DESCRIPTION OF THE DRAWINGS

Many aspects of the present method for making a liquid crystal display screen can be better understood with reference to the following drawings. The components in the drawings are not necessarily drawn to scale, the emphasis instead being placed upon clearly illustrating the principles of the present liquid crystal display screen.

Figure 1:
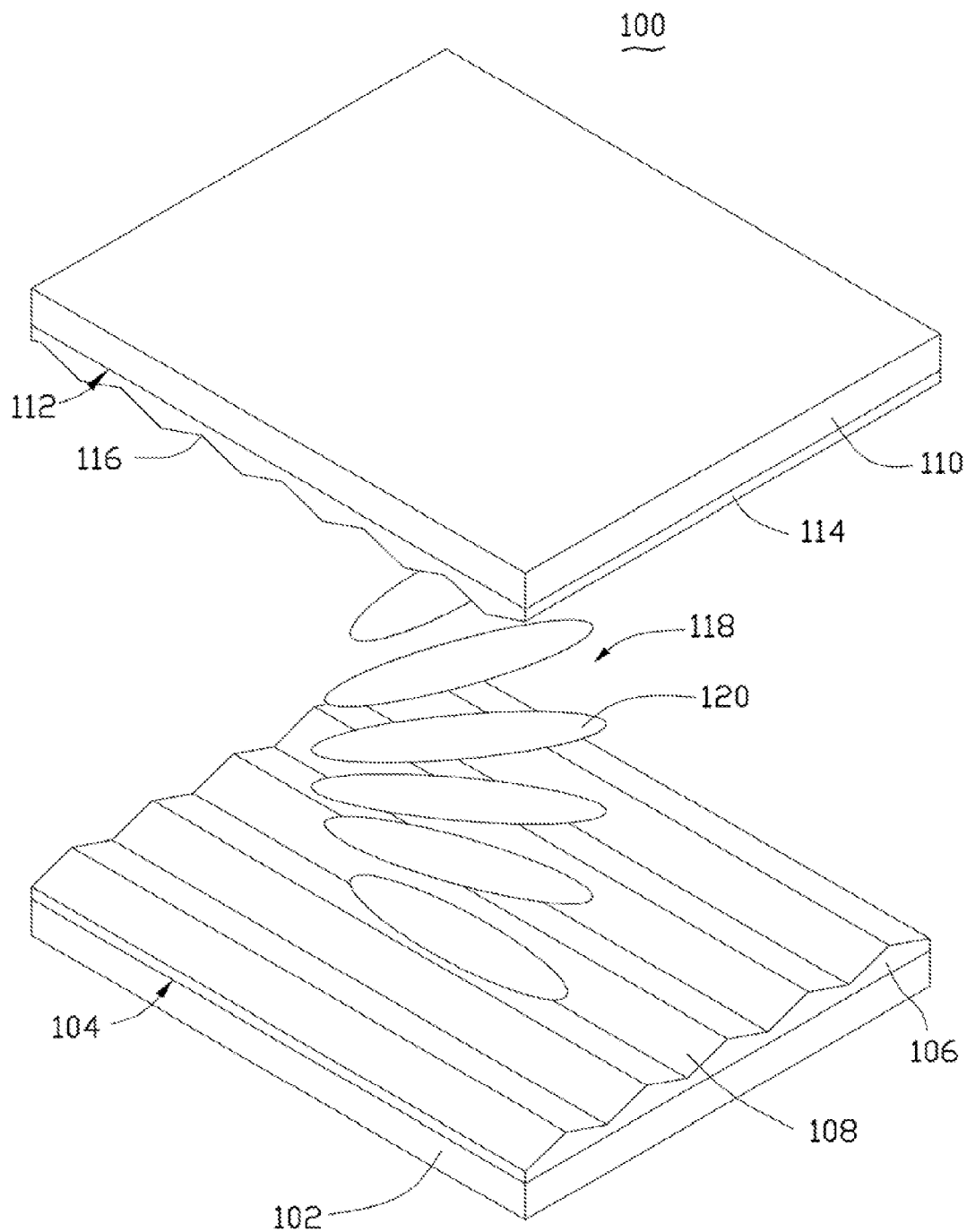
FIG. 1 is a schematic view of a conventional liquid crystal display screen.

Corresponding reference characters indicate corresponding parts throughout the several views. The exemplifications set out herein illustrate at least one embodiment of the present method for making the liquid crystal display screen, in at least one form, and such exemplifications are not to be construed as limiting the scope of the invention in any manner.

DETAILED DESCRIPTION OF EXEMPLARY EMBODIMENTS

References will now be made to the drawings to describe, in detail, various embodiments of the present method for making the liquid crystal display screen.

Figure 2:
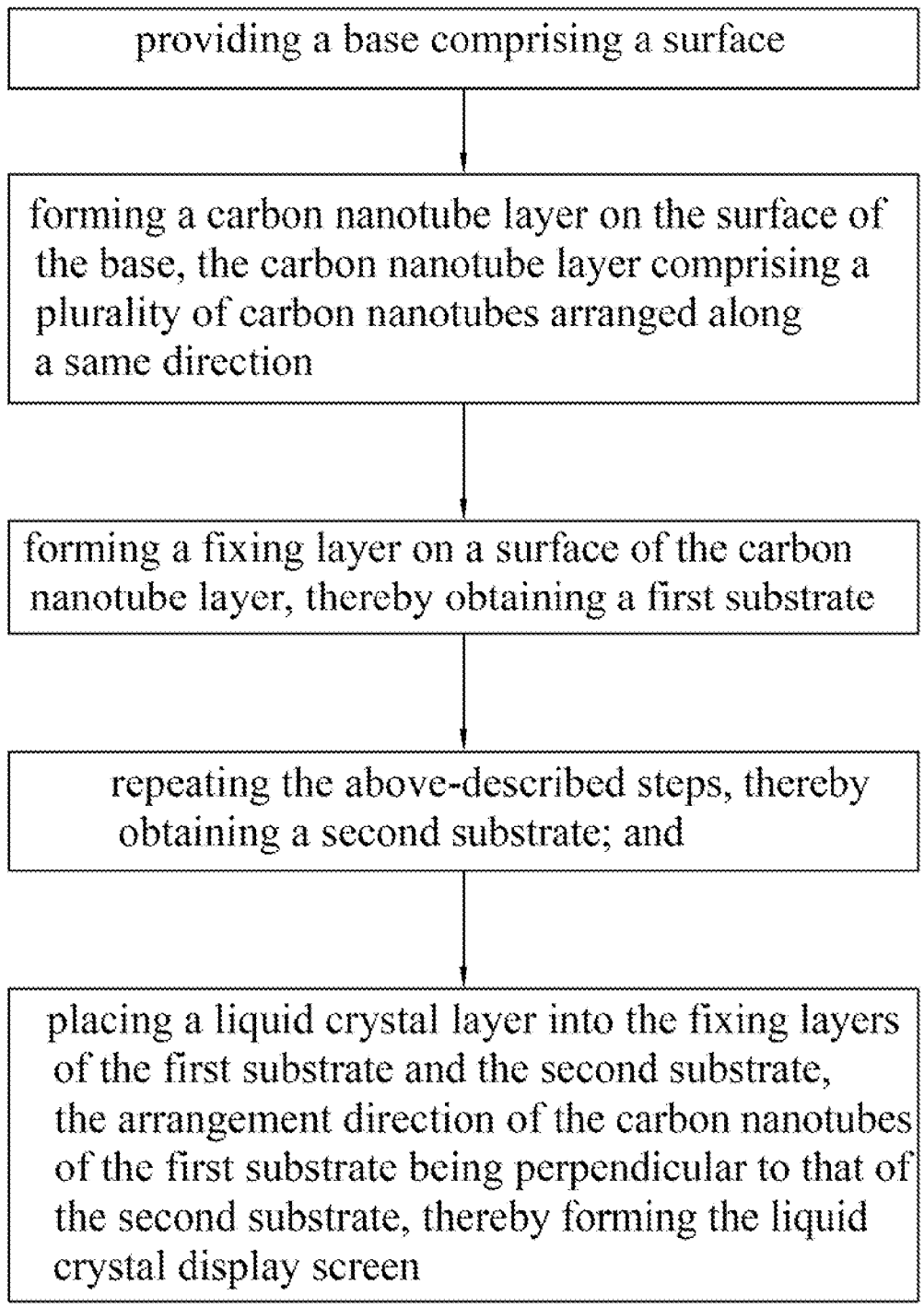
FIG. 2 is a flow chart of a method for making a present liquid crystal display screen, in accordance with a present embodiment.
Figure 3:
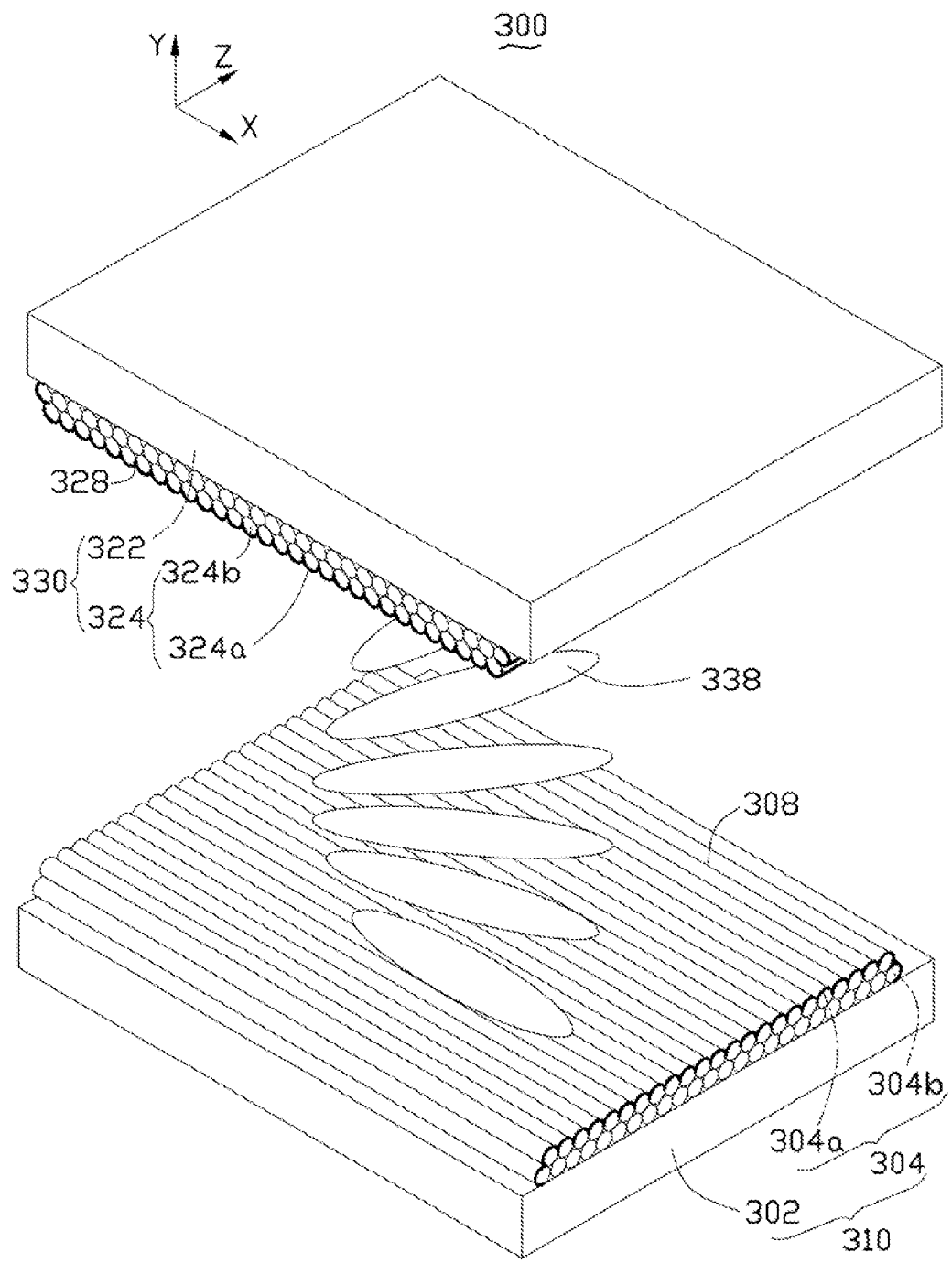
FIG. 3 is a schematic view of the present liquid crystal display screen in accordance with a present embodiment.

Referring to FIGS. 2 and 3, a method for making a liquid crystal display screen 300 includes the steps of: (a) providing a base including a surface; (b) manufacturing a first substrate 330; where manufacturing the first substrate 330 includes: (b1) forming a first carbon nanotube layer 324b on the surface of the base, the first carbon nanotube layer 324b including a plurality of carbon nanotubes arranged along a same direction; (b2) forming a first fixing layer 324a on a surface of the first carbon nanotube layer 324b, thereby obtaining the first substrate 330; (c) repeating the steps of manufacturing the first substrate 330, thereby obtaining a second substrate 310; and (d) placing a liquid crystal layer 338 between the first substrate 330 and the second substrate 310, wherein the carbon nanotubes of the first substrate 330 are perpendicular to carbon nanotubes of the second substrate 310.

In step (a), the material of a first base 322 is selected from the group consisting of glass, quartz, diamond, and plastics. The first base 322 is made of flexible materials, such as cellulose triacetate (CTA). In the present embodiment, the first base 322 comprises CTA. A thickness of the first base 322 is 2 millimeters, a width of the first base 322 is 20 centimeters, and a length of the first base 322 is 30 centimeters.

In the present embodiment, in step (b1), a method for fabricating the first carbon nanotube layer 324b includes the steps of: (b11) providing an array of carbon nanotubes, specifically, providing a super-aligned array of carbon nanotubes; (b12) pulling out a carbon nanotube film from the array of carbon nanotubes by using a tool (e.g., adhesive tape, pliers, tweezers, or another tool allowing multiple carbon nanotubes to be gripped and pulled simultaneously); (b13) treating the carbon nanotube film with an organic solvent or external mechanical force to form a carbon nanotube wire; and (b14) placing a plurality of above-described carbon nanotube wires in parallel, attached on the first base 322, thereby forming the first carbon nanotube layer 324b.

In another embodiment, in step (b1), a method for fabricating the above-described first carbon nanotube layer 324b includes the steps of: (b11') providing an array of carbon nanotubes, specifically, providing a super-aligned array of carbon nanotubes; (b12') pulling out a carbon nanotube film from the array of carbon nanotubes by using a tool (e.g., adhesive tape, pliers, tweezers, or another tool allowing multiple carbon nanotubes to be gripped and pulled simultaneously); (b13') laying the carbon nanotube films side by side on the first base 322 or overlapping the carbon nanotube films on the first base 322, thereby forming the first carbon nanotube layer 324b.

In the present embodiment, the super-aligned array of carbon nanotubes is fabricated by the chemical vapor deposition method. The super-aligned array of carbon nanotubes includes a plurality of carbon nanotubes parallel to each other and more or less perpendicular to the substrate. The carbon nanotubes in the array can be single-walled carbon nanotubes, double-walled carbon nanotubes, or multi-walled carbon nanotubes. Diameters of the single-walled carbon nanotubes are in the approximate range from 0.5 to 10 nanometers. Diameters of the double-walled carbon nanotubes are in the approximate range from 1 to 50 nanometers. Diameters of the multi-walled carbon nanotubes are in the approximate range from 5 to 50 nanometers.

The array of carbon nanotubes related in step (b11) is not limited to the above-described method. Alternatively, methods such as the graphite electrode constant current arc discharge deposition method and the laser evaporation deposition method can also be used to fabricate the array of carbon nanotubes.

In step (b12), the carbon nanotube film can be formed by the substeps of: selecting a plurality of carbon nanotube segments having a predetermined width from the array of carbon nanotubes; and pulling the carbon nanotube segments at an even/uniform speed to achieve a uniform carbon nanotube film.

The carbon nanotube segments having a predetermined width can be selected by using a tool, such as adhesive tapes, pliers, tweezers, or other tools allowing multiple carbon nanotubes to be gripped and pulled simultaneously to come in contact with the super-aligned array. The pulling direction is substantially perpendicular to the growing direction of the super-aligned array of carbon nanotubes.

More specifically, during the pulling process, as the initial carbon nanotube segments are drawn out, other carbon nanotube segments are also drawn out end-to-end due to the van der Waals attractive force between ends of adjacent segments. This process of drawing ensures that a continuous, uniform carbon nanotube film can be formed. The pulling/drawing method is simple, fast, and suitable for industrial applications.

In step (b13), the carbon nanotube film is soaked in an organic solvent. The step is described in U.S. Pat. Pub. No. 2007/0166223, which is incorporated herein by reference. Since the untreated carbon nanotube film is composed of a number of carbon nanotubes, the untreated carbon nanotube film has a high surface area to volume ratio and, thus, may easily become stuck to other objects. During the surface treatment, the carbon nanotube film is shrunk into a carbon nanotube wire after the organic solvent has volatilized, due to factors such as surface tension. The surface area to volume ratio and diameter of the carbon nanotube wire is reduced, when compared to the nanotube film. As a result, the stickiness of the carbon nanotube film is lowered, and the strength and toughness of the carbon nanotube film is improved. The organic solvent may be a volatilizable organic solvent, such as ethanol, methanol, acetone, dichloroethane, chloroform, and any combination thereof. A diameter of the carbon nanotube wires is in an approximate range from 0.5 nanometers to 100 micrometers ($\mu m$).

In step (b13), the carbon nanotube film can also be treated with external mechanical force (e.g., a conventional spinning process), which effectively twists film, comprising of multiple nanotubes, into the carbon nanotube wire. A process of treating the carbon nanotube film includes the substeps of: providing a spinning axis; attaching one end of the carbon nanotube film to the spinning axis; and spinning about the spinning axis to form a twisted carbon nanotube wire.

After step (b12) or (b13), the carbon nanotube wires can be connected and/or overlapped to obtain the carbon nanotube layer.

The carbon nanotube layer comprises one or more carbon nanotube wires or one or more carbon nanotube films. The carbon nanotube film includes a plurality of carbon nanotube segments joined end-to-end, wherein each carbon nanotubes segments includes a plurality of parallel carbon nanotubes attracted by van der Waals attractive force. There may be some overlap between adjacent segments. Thus, with either nanotube films or wires, a plurality of uniformly distributed and parallel gaps are established. Thus, the gaps are used as microgrooves that align the molecules of liquid crystal.

Moreover, after step (a), a process of cleaning the base is also included. The process is carried out by using organic solvents or de-ionized water. Finally, the base is dried by protective gases.

Due to the carbon nanotube layer being sticky in the present embodiment, the carbon nanotube layer can be directly adhered to the base without the use of an adhesive. A step of treating the carbon nanotube layer by organic solvents while on the base can firmly attach the carbon nanotube layer to the base.

Some embodiments may employ a step of forming an adhesive layer on the base is further included after the base has been dried. The carbon nanotube layer 324b can be attached to the base 322 via an adhesive agent or transparent conductive glue.

In step (b2), when the materials of the first fixing layer 324a are selected from diamonds, silicon nitrogen, hydride of random silicon, silicon carbon, silicon dioxide, aluminium oxide, tin oxide, cerium oxide, zinc titanate, and indium titanate. The first fixing layers 324a are fabricated by the evaporating methods, sputtering method, and plasma enhanced chemical vapor deposition. When the materials of the first fixing layers 324a are selected from polyethylene ethanol, polyamide, polymethyl methacrylate, and polycarbonate, the first fixing layer 324a is sprayed on the first carbon nanotube layer 324b. A thickness of the first fixing layer 324a is in an approximate range from 20 nanometers to 2 micrometers.

In the present embodiment, forming the first fixing layer 324a on the first carbon nanotube layer 324b includes the following steps: (b21) dissolving powder of an organic material into a solvent to form a solution; (b22) dipping the solution on the first carbon nanotube layer 324b and spinning the first carbon nanotube layer 324b in a spinning machine; and (b23) heating the first carbon nanotube layer 324b to form the first fixing layer 324a on the first carbon nanotube layer 324b.

In the present embodiment, in the step (b21), the organic material is polyimide (PI). The solvent is a volatile organic solvent. The concentration of the solution is in the range from 1% to 10%. In another embodiment, the solvent is γ-butyrolactone. The concentration of the PI solution is 5%.

In step (b22), the amount of PI solution applied to the first carbon nanotube layer 324b determines the thickness of the first fixing layer 324a. Generally, the thickness of the first fixing layer 324a is in the range from 10 nanometers to 2 micrometers. The spinning rate is in the range from 1000 rotations per minute (r/min) to 8000 r/min. In the present embodiment, the spinning rate is 5000 r/min and the spinning time is 60 seconds. As a result, the thickness of the first fixing layer 324a is 80 nanometers.

In step (b23), the heating treatment is used to remove the residual solvent and to dry the first carbon nanotube layer 324b. In the present embodiment, the heating temperature is 250° C. and the heating time is 60 seconds. The heating temperature and the heating time are selected according to user-specific needs.

Due to the gaps in the first carbon nanotube layer 324b, when the first fixing layer 324a is covered on the first carbon nanotube layer 324b, a plurality of parallel first grooves 328 are formed on the first fixing layer 324a to align the molecules of liquid crystal. The first alignment layer 324 includes the first carbon nanotube layer 324b and the first fixing layer 324a. Because the first fixing layer 324a acts as a sealant for the carbon nanotube layer 324b and prevents it from being exposed, the first alignment layer 324 is not removed when the first alignment layer 324b comes in contact with the liquid crystal molecules or atmosphere for a long period of time. Thus, the present alignment layer has a good alignment quality when used in the liquid crystal screen.

A second substrate 310 includes a second carbon nanotube layer 304b, a second fixing layer 304a and a second base 302. The second carbon nanotube layer 304b and the second fixing layer 304a can have the same structure and can be produced in the same manner as their corresponding parts of the on the first base 322. The structure of the second substrate 310 is similar to that of the first substrate 330. A plurality of second grooves 308 are formed on the second fixing layer 304 to align the liquid crystal molecules.

In step (c), the liquid crystal material is inserted between the first substrate 330 and the second substrate 310, thereby a liquid crystal layer 338 is placed therebetween. The liquid crystal layer 338 includes a plurality of cigar-shaped liquid crystal molecules. In the present embodiment, the first fixing layer 304a and the second fixing layer 324a are adjacent to the liquid crystal layer 338. Specifically, the first grooves 328 are disposed along the X-axis, and the second grooves 308 are disposed along the Z-axis. Furthermore, the edges between the first substrate 330 and the second substrate 310 can be sealed by silicon sulfide rubber 706B seal glue.

In order to maintain enough spacing between the first substrate 330 and the second substrate 310, a plurality of spacers (not shown) are disposed between them. The size and the material of the spacer can be selected based on user-specific needs. In the present embodiment, a plurality of polyethylene (PE) balls are dispersed in the ethanol, and the solution containing the PE balls are put on the first substrate 330 and the second substrate 310. After the ethanol has evaporated, the PE balls between the first substrate 330 and the second substrate 310 are used as spacers. The diameter of the PE balls is in the range from 1 to 10 micrometers.

Because the carbon nanotubes in the carbon nanotube layer are arranged in parallel, the carbon nanotube layer has a polarization to light, thus, can be used to replace the conventional polarizer. In other embodiments, at least one polarizer is disposed on the first substrate 330 and the second substrate 310.

The present method for making the liquid crystal display screen 300 has the following advantages. Due to gaps existing within the carbon nanotube layer, the fixing layer covered on the carbon nanotube layer also directly forms a plurality of grooves. Therefore, an additional process for forming grooves is not needed, reducing the fabricating cost and simplifying the production process. Furthermore, by overlapping a fixing layer on the carbon nanotube layer, this ensures that the carbon nanotube layer of the alignment layer does not fall off when it comes in contact with the liquid crystal layer.

Finally, it is to be understood that the above-described embodiments are intended to illustrate, rather than limit, the invention. Variations may be made to the embodiments without departing from the spirit of the invention as claimed. The above-described embodiments illustrate the scope of the invention but do not restrict the scope of the invention.

It is also to be understood that above description and the claims drawn to a method may include some indication in reference to certain steps. However, the indication used is only to be viewed for identification purposes and not as a suggestion as to an order for the steps.

What is claimed is:

1. A method for making liquid crystal display, the method comprising the steps of:
   (a) providing a base comprising a surface;
   (b) placing a carbon nanotube layer on the surface of the base, the carbon nanotube layer comprising a plurality of carbon nanotubes substantially aligned along a same direction;
   (c) applying a fixing layer on a surface of the carbon nanotube layer by dipping a solution of the fixing layer on the carbon nanotube layer and spinning the carbon nanotube layer in a spinning machine, thereby obtaining a first substrate, the fixing layer acting as a sealant for the carbon nanotube layer and preventing the carbon nanotube layer from being exposed, and a plurality of parallel grooves being formed on the fixing layer;
   (d) repeating the steps (a)-(c) to form a second substrate; and
   (e) applying a liquid crystal layer between the fixing layer of the first substrate and the fixing layer of the second substrate, wherein the carbon nanotubes of the first substrate are arranged perpendicular to that of the second substrate.

2. The method of claim 1, wherein in step (b), a process of forming the carbon nanotube layer comprises the substeps of:
   providing an array of carbon nanotubes;
   pulling out a carbon nanotube film from the array of carbon nanotubes by using a tool; and
   laying the carbon nanotube film on the base, thereby forming the carbon nanotube layer.

3. The method of claim 1, wherein in step (b), a process of forming the carbon nanotube layer comprises the substeps of:
   providing an array of carbon nanotubes;
   pulling out a carbon nanotube film from the array of carbon nanotubes by using a tool;
   treating the carbon nanotube film with an organic solvent or external mechanical force to form a carbon nanotube wire; and
   placing a plurality of carbon nanotube wires, in parallel, on the base, thereby forming the carbon nanotube layer.

4. The method of claim 3, wherein the process of external mechanical force comprises the substeps of: providing a spinning axis; attaching one end of the carbon nanotube film or the carbon nanotube film to the spinning axis; and spinning the carbon nanotube film about the spinning axis to form the carbon nanotube wire.

5. The method of claim 1, further comprising cleaning the base, the cleaning is carried out by using organic solvents or de-ionized water, and the base is dried in an environment comprising protective gases.

6. The method of claim 5, further comprising applying an adhesive layer on the base.

7. The method of claim 1, further comprising treating the carbon nanotube layer with organic solvents.

8. The method of claim 1, wherein materials of the fixing layer are selected from the group consisting of diamond, silicon nitrogen, hydride of random silicon, silicon carbon, silicon dioxide, aluminum oxide, tin oxide, cerium oxide, zinc titanate, and indium titanate.

9. The method of claim 1, wherein materials of the fixing layer are selected from the group consisting of polyethylene ethanol, polyamide, polymethyl methacrylate, and polycarbonate.

10. The method of claim 1, wherein the solution of the fixing layer is formed by dissolving powder of an organic material into a solvent.

11. The method of claim 1, wherein a thickness of the fixing layer is in an approximate range from 10 nanometers to 2 micrometers.

12. The method of claim 1, wherein in step (c), the liquid crystal layer is supplied by placing liquid crystal material between the first and second substrate.

13. The method of claim 12, further comprising a step of disposing a plurality of transparent spacers on the fixing layer of at least one of the first or second substrate.

14. The method of claim 13, wherein the process of disposing the transparent spacers comprises the substeps of dispersing a plurality of polyethylene balls in ethanol to form a solution; applying the solution on the fixing layer of at least one of the first and second substrate; and evaporating the ethanol.

15. The method of claim 14, further comprising securing the first substrate and the second substrate to each other.

* * * * *